United States Patent [19]

Vander Molen

[11] Patent Number: 4,520,576

[45] Date of Patent: Jun. 4, 1985

[54] CONVERSATIONAL VOICE COMMAND CONTROL SYSTEM FOR HOME APPLIANCE

[75] Inventor: Donald R. Vander Molen, Lincoln Township, Berrien County, Mich.

[73] Assignee: Whirlpool Corporation, Benton Harbor, Mich.

[21] Appl. No.: 529,504

[22] Filed: Sep. 6, 1983

[51] Int. Cl.³ .............................................. F26B 21/06
[52] U.S. Cl. .......................................... 34/45; 34/55; 367/198; 219/10.55 B
[58] Field of Search ................. 367/198; 219/10.55 B, 219/10.55 C, 10.55 R; 34/44, 45, 48, 55

[56] References Cited

U.S. PATENT DOCUMENTS

| | | | |
|---|---|---|---|
| 2,776,826 | 1/1957 | Bennett et al. | 34/82 |
| 4,206,552 | 6/1980 | Pomerantz et al. | 34/43 |
| 4,221,927 | 9/1980 | Dankman et al. | |
| 4,275,266 | 6/1981 | Lasar | |
| 4,340,797 | 7/1982 | Takano et al. | |
| 4,340,798 | 7/1982 | Ueda et al. | |
| 4,340,799 | 7/1982 | Ueda et al. | |
| 4,340,800 | 7/1982 | Ueda et al. | |
| 4,343,990 | 8/1982 | Ueda | |
| 4,348,550 | 9/1982 | Pirz et al. | |
| 4,351,999 | 9/1982 | Nagamoto et al. | |
| 4,385,452 | 5/1983 | Deschaaf et al. | |
| 4,389,109 | 6/1983 | Taniguchi et al. | |

Primary Examiner—Larry I. Schwartz
Attorney, Agent, or Firm—Hill, Van Santen, Steadman & Simpson

[57] ABSTRACT

A speaker independent conversational voice command control system is provided which is useful in connection with home appliances which operate within a range of selectable parameters, such as an automatic clothes dryer. The control system recognizes voice commands and emits synthesized speech sounds, in an interaction with a user, to obtain the input necessary for setting the operating parameters.

8 Claims, 7 Drawing Figures

CONVERSATIONAL VOICE COMMAND CONTROL SYSTEM FOR HOME APPLIANCE

BACKGROUND OF THE INVENTION

1. Field of the Invention

The present invention relates to a control system for a home appliance and more specifically to a conversational, speaker independent voice command control system.

2. Description of the Prior Art

Control systems responsive to human voice are disclosed in a number of U.S. Patents. For example, U.S. Pat. No. 4,221,927 discloses a voice responsive "talking" toy which has a body, eyes and mouth and which generates a train of audio pulses in response to a complex sound such as human speech. LEDs are activated in the eye portions of the toy and when human speech is detected and LEDs in the mouth portion are activated when the toy generates the train of audio pulses. The toy does not recognize different human speech patterns, but rather is activated upon detection of complex sounds such as human speech.

U.S. Pat. No. 4,275,266 discloses a device to control machines by voice which responds to a plurality of predetermined musical tones in a sequence to generate a digital control output signal. The device disclosed does not recognize human speech patterns, but rather it responds to pure tone and ratios between the frequencies of those tones.

U.S. Pat. No. 4,340,797 discloses a voice actuated heating apparatus which recognizes a voice command and controls heating members when at least two sequential voice commands are recognized in a predetermined order. The recognized command may be displayed to the user for confirmation and manual inputs through touch switches and the like may also be made.

U.S. Pat. No. 4,340,798 discloses a voice-controlled safety arrangement heating apparatus which recognizes several voice commands for presetting and starting a heating operation.

U.S. Pat. No. 4,340,799 discloses a heating apparatus with voice actuated door opening mechanism which includes a voice recognition circuit, a voice synthesizer circuit and a control means actuated by recognized voice pattern to drive a releasing means to open a door on the heating apparatus.

U.S. Pat. No. 4,430,800 discloses a heating apparatus having voice command control operative in a conversational processing manner in which the control system operates in four modes. In the first mode the user makes specific verbal utterances which are recognized by a voice recognition circuit. In a second mode the apparatus makes an inquiry of the user through a voice synthesizing circuit. In a third mode the user responds with specific commands and in a fourth mode the apparatus implements the selected program.

U.S. Pat. No. 4,343,990 discloses a heating apparatus safety device using a voice synthesizer in which manually selected commands are inputted to the device through switches and a synthetic voice synthesizer announces the accepted function selected over the next operating step. No voice recognition circuitry is involved in the disclosure.

U.S. Pat. No. 4,348,550 discloses a spoken word controlled automatic dialer having a circuit which identifies input utterances being command words, repertory words or other non-recognized words. A programmed microprocessor system is disclosed to implement the main controller function.

U.S. Pat. No. 4,389,109 discloses a camera which has a voice command responsive system operable in a learning mode and a working mode. In the learning mode, voice commands are received and stored in various registers for later comparison. In the working mode, voice commands are received and compared with previously stored commands for generating a control signal relating to the register of the stored recognized command. The camera also has a speaker for producing synthesized speech in both modes of operation.

SUMMARY OF THE INVENTION

The present invention provides a conversational voice command control system for a home appliance such as a clothes dryer which utilizes a speaker independent, isolated word speech recognition module, a speech synthesis module, a master control micro-computer and the appliance control system. The speech recognition module consists of two operational amplifier stages that are used for wave shaping and a speech recognition integrated circuit which contains a speech recognition algorithm. The speech synthesis module consists of a speech processor integrated circuit, a memory block that contains the speech code, an audio amplifier and a speaker. The master microcomputer handles the input information from the speech recognition module, does the address or word select for the speech synthesis module and provides the necessary inputs to the dryer control system and the dryer. The dryer control system can be an existing electronic control capable of also receiving manual input selections.

The operational sequence for the system begins by the user issuing a two word greeting. Two words are used to compensate for the relative lack of selectivity in the speech recognition device. Recognition of the first word sets a two second time frame where the second word must be spoken and recognized to initiate the programming sequence. Once this sequence has been accepted, the dryer door will open automatically and the synthesizer will announce a greeting. The master control computer will then wait for the clothing to be loaded and the door to close. Upon sensing of the door closure, the synthesizer will make an announcement for instance, "please check the lint trap". The control unit will then wait for the lint screen to be removed and then reinserted. Upon reinsertion the system will make additional requests such as "please select fabric temperature cycle" and then the user may touch an appropriate button on the control panel or verbally give a desired command. Recognition of the speech input actuates the appropriate cycle. After acceptance of the cycle input, the system will make an additional announcement such as "the control is ready". The dryer control system automatically sets normal dryness. At this time, the user may modify the cycle selection by touching the appropriate buttons on the control panel. To get the dryer to commence operation, the user must make further announcements such as "OK". Upon recognition of this final command, the motor and the heater are started. The master control will then wait for a door opening or the machine to shut off. Machine shut-off always resets the main control to the start. Door opening and subsequent closure during mid cycle resets the main program to the announcement "please select fabric temperature cycle".

DESCRIPTION OF THE PREFERRED EMBODIMENT

Although the voice command appliance control system of the present invention can be utilized in a wide range of domestic appliances as well as other devices which have electronic or manual controls for setting the parameters of various functions performed by the device, the description of the present invention will be explained in terms of its use in an automatic clothes dryer as a specific example. It should be understood that I do not wish to limit the scope of the invention for use only in an automatic dryer, but rather I am explaining the invention by use of the dryer as a specific example.

Figure 1:
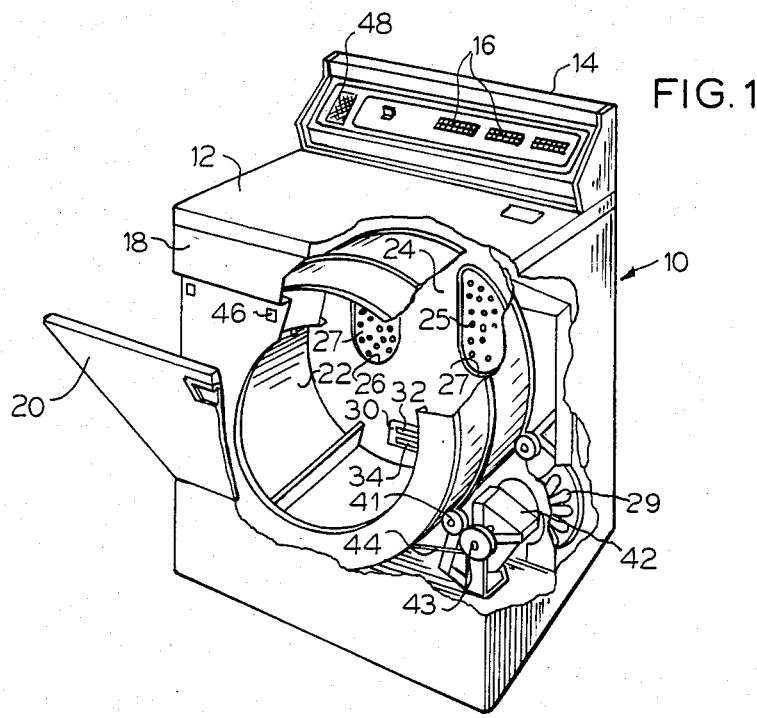
FIG. 1 is a perspective view of a dryer partially cut away to show the interior thereof and having a control system embodying the principles of the present invention.

In FIG. 1 there is generally shown an automatic dryer 10 having a cabinet 12 and a control console 14 with controls 16 thereon. The controls 16 are generally shown as touch control switches, however, the controls may be of any number of types commonly known in the art. The controls provide fabric selection, automatic dry, timed dry, air and touch-up drying cycles. A range of selections are available in the automatic and timed dry cycles. A front 18 of the cabinet 12 has a door 20 which provides access to the interior of the dryer 10 including a rotatable drum 22. Provided in a rear stationary bulkhead 24 at the rear of the drum 22 there is an air inlet aperture 26 with a perforate cover plate 27 across the aperture 26 and an air outlet aperture 28 formed by perforations 25 in the bulkhead 24 through which air is circulated by a blower or fan 29 during the drying operation.

Although not shown, a heating element is provided in the airflow path which is selectively energized by a control logic circuit to provide heated air to the interior of the dryer 10 as required. Blower 29 is connected in an air-flow relationship with the air inlet and outlet apertures so that air is drawn into the drum 22 by way of the aperture 26 after first passing the heating element and is withdrawn from the drum through the aperture 28. An electric motor 42 drives the blower and is also provided to rotate the drum by means of a drive pulley 43, a tensioning idler 41 and a belt 44.

At least one sensor 30 is provided which can be in contact with the clothes load during the drying operation while the drum is rotating. The sensor 30 is comprised of two electrodes 32 and 34 which are connected by a pair of conductors to a low voltage moisture sensor circuit. The operation of such a dryer is described in U.S. Pat. No. 4,385,452 which issued to the assignee of the present application and which is incorporated herein by reference.

Associated with the dryer door 20 is a micro-switch 46 which detects opening and closing of the door 20. Provided on the control console 14 is an audio speaker and microphone 48. A lint trap access door 49 is located on the exterior of the cabinet 12 and has an associated micro-switch (not shown) which can detect if the access door is open or closed.

Figure 2:
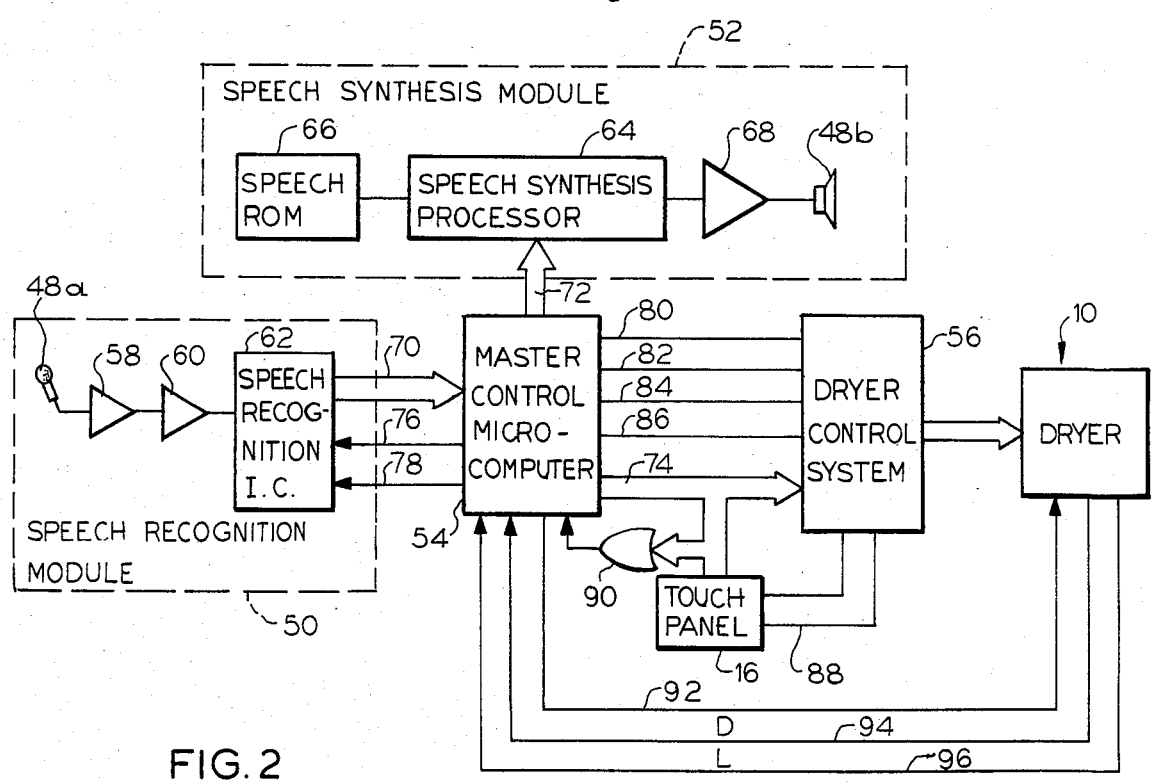
FIG. 2 is a block diagram of the electronic components utilized in the control system.
Figure 3A:
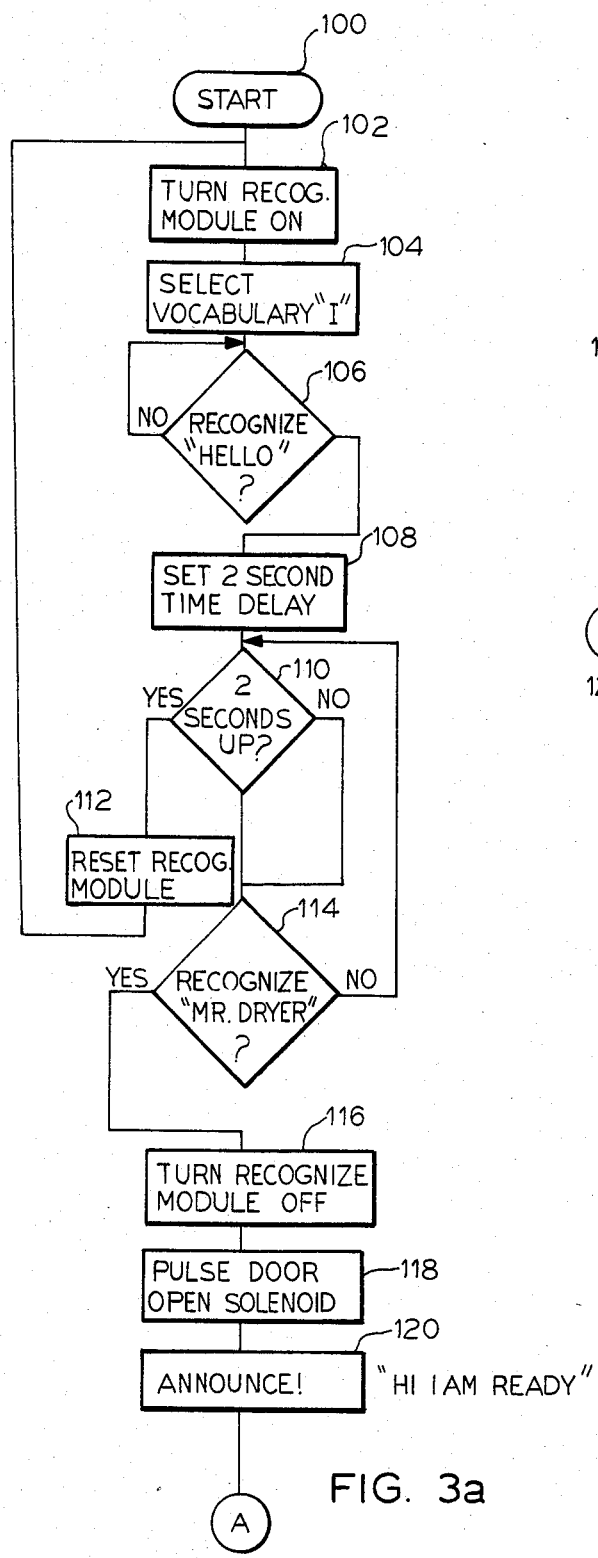
FIGS. 3a, 3b, 3c, 3d, and 3e comprise a flow chart showing the steps of operation of the control system.
Figure 3B:
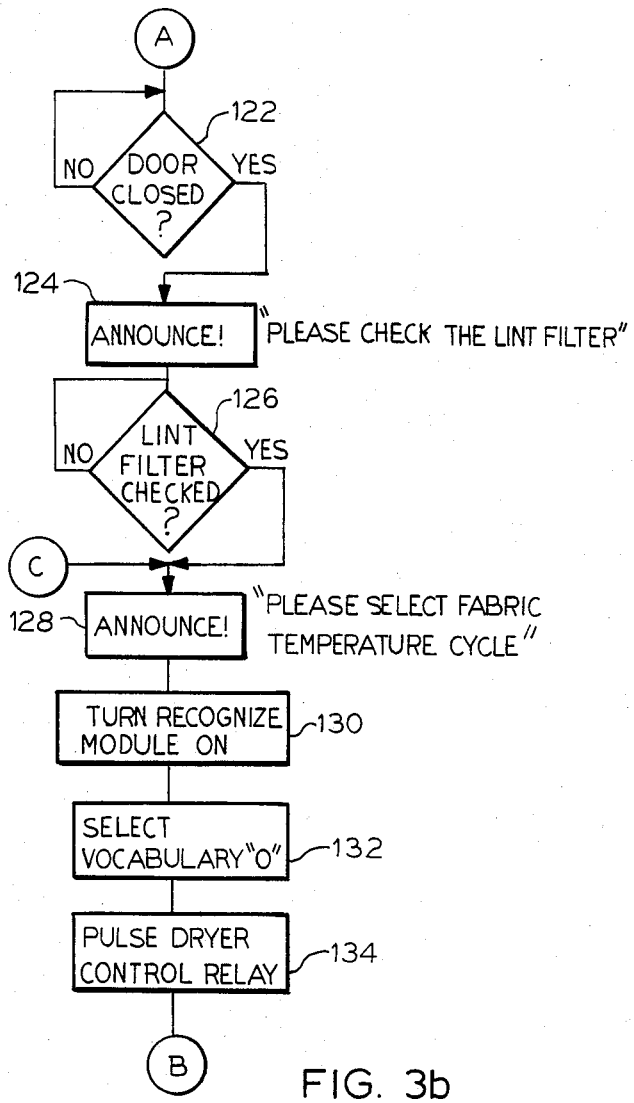
Figure 3C:
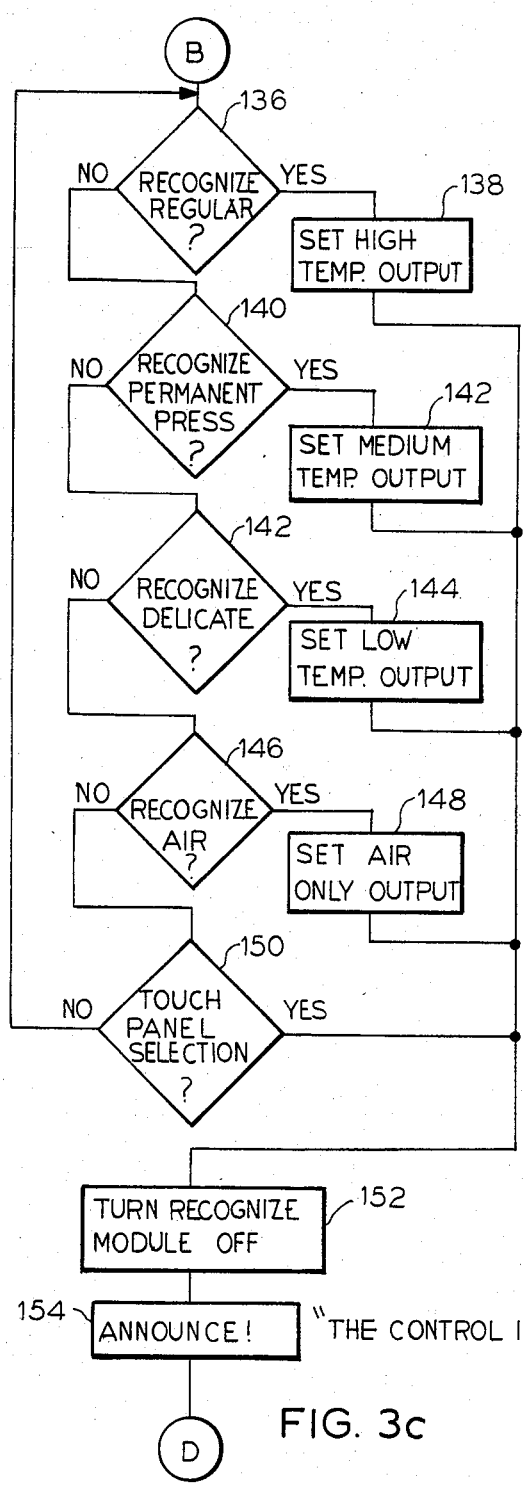
Figure 3D:
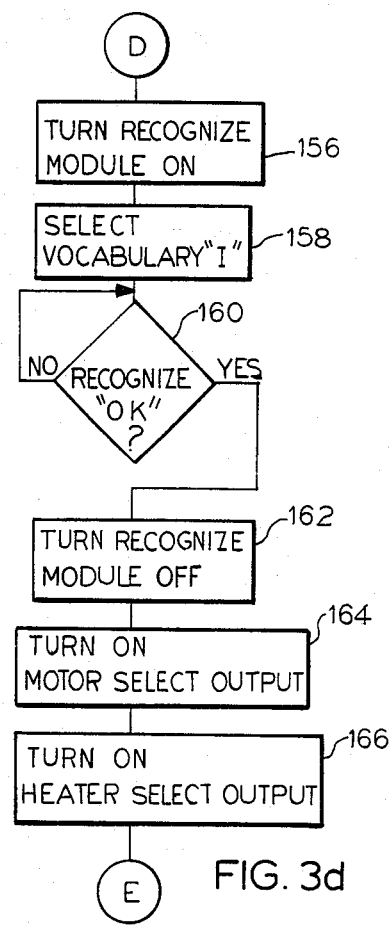
Figure 3E:
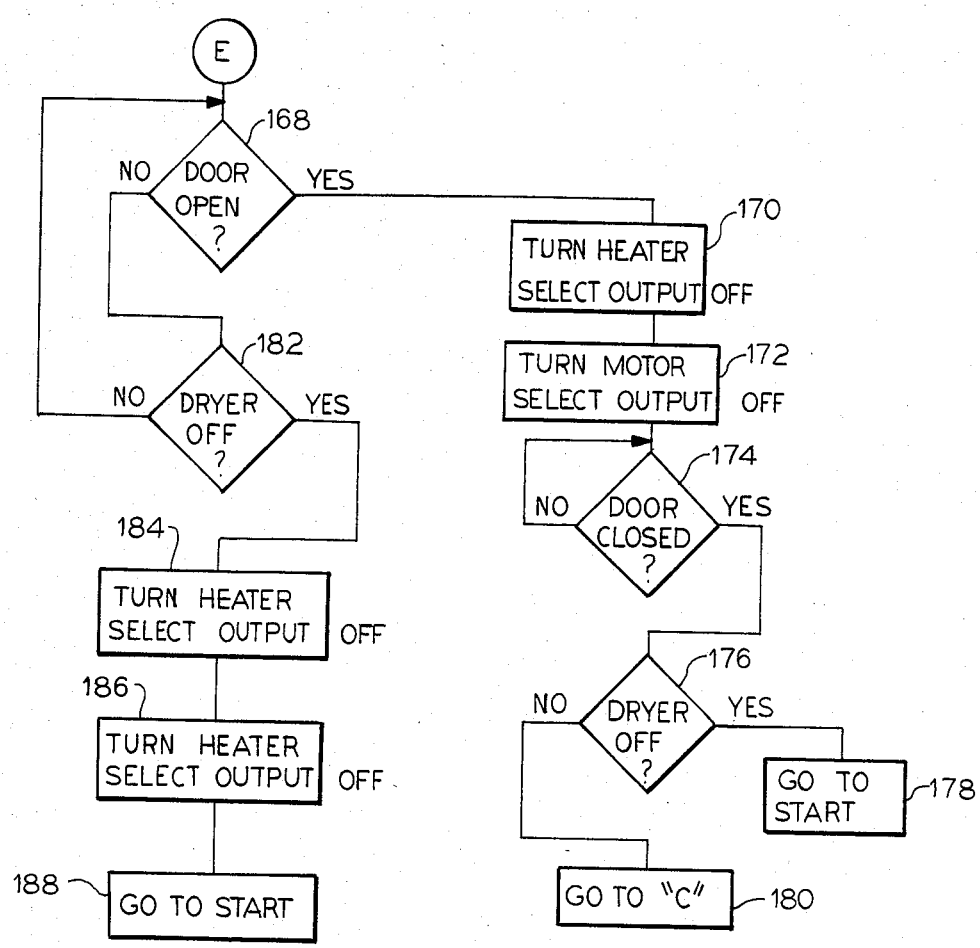

The circuitry utilized in the appliance control system is shown in block diagram form in FIG. 2. The basic components of the system comprise a speech recognition module 50, a speech synthesis module 52, a master control microcomputer 54 and the appliance control system 56.

The speech recognition module includes a microphone 48a, two operational amplifier stages 58, 60 which are used for wave shaping and a speech recognition integrated circuit 62 which contains a speech recognition algorithm. The speech recognition integrated circuit should be speaker independent, which means that the recognition is not limited to the speech of a particular speaker, but rather the speech of any speaker would be recognized. Such an integrated circuit is available from Weitek Corporation and is identified as part no. WTV 008.

The speech synthesis module 52 consists of a speech processor integrated circuit 64, a memory block 66 which contains the speech code, an audio amplifier 68 and an audio speaker 48b. A speech synthesis processor integrated circuit is commercially available from Texas Instruments, Inc. as part no. TMS 5100.

The master control microcomputer 54 receives input information from the speech recognition module 50 as designated by input arrow 70, does the address or word select for the speech synthesis module 52 as seen by output arrow 72, and provides the necessary inputs to the dryer control system as seen by arrow 74. A microcomputer which can be used in this device is commercially available from Texas Instruments, Inc. as part no. TM 990/101M. This microcomputer has a built in source of timing pulses and counter for use as an internal timer.

Besides receiving command inputs from the speech recognition integrated circuit as shown by arrow 70, the master control microcomputer in turn controls the speech recognition I.C. by energizing it with an input over line 76 and by selecting a desired vocabulary by an input over line 78. With respect to the dryer control system, the master control microcomputer transmits signals on line 80 for selection and energization of the heating element, on line 82 for energization of the electric motor 42 and for selecting the dryer control system on line 84. The master control microcomputer receives a "power on" input from the dryer control system on line 86.

The touch panel buttons 16 are connected to the dryer control system 56 over line 88 and can be used to provide inputs to the master control microcomputer 54 through an OR gate 90. Some inputs can be made either through the touch panel 16 or through the speech recognition module 50.

The master control microcomputer operates the release and opening of the dryer door 20 over line 92 and it receives signals which represent detection of the dryer door being opened over line 94 and the lint trap being opened over line 96.

The steps of operation of the device described above is shown in the flow chart which comprises FIGS. 3a through 3e. The control program is initiated at a starting control unit 100 from which control is passed to unit 102 which turns the recognition module on. Referring to FIG. 2, this comprises an output signal from the master control microcomputer 54 over line 76 to the speech recognition I.C. Control is then passed to control unit 104 which selects a particular vocabulary to be used by the speech recognition I.C., in this case vocabulary "1". This is done by the master control microcomputer 54 sending an appropriate signal over line 78 to the speech recognition I.C..

In this particular embodiment, two vocabulary sets are used, vocabulary "1" containing the words "Hello", "Mister Dryer" and "OK". Vocabulary "0" contains the words "Regular", "Permanent Press", "Delicate" and "Air". Other vocabulary words could be utilized as needed or desired for the particular control of the device utilizing the control system of the present invention.

After vocabulary "1" has been selected, control is passed to control unit 106 which continuously inquires whether the word "hello" is recognized. Once that word is recognized, control is passed to control unit 108 which sets a two second time delay. Control is then passed to control unit 110 which inquires if the two second time period has been consumed. If the answer to the inquiry is yes, then control is passed to control unit 112 which resets the recognition module and returns control to control units 102 for repetition of the above steps.

If control unit 110 has determined that the two second period has not yet passed, then control is passed to control unit 114 which inquires whether the word "Mr. Dryer" has been recognized. If that word has not yet been recognized then control is returned to control unit 110 for determination of whether the two second time period has run out. In this manner, control unit 114 will continuously look for the recognition of the word "Mr. Dryer" within the two second time period. If that word is not recognized within the two seconds, then control is again returned to control unit 102 for reinitializing the program. If the word "Mr. Dryer" is recognized within the two second time period, then control is passed to control unit 116 which causes the speech recognition module to be turned off.

Control is then passed to control unit 118 which sends a pulse to the door open solenoid which would travel on line 94 shown in FIG. 2, and would cause the dryer door 20 to open. Control would then be passed to control unit 120 which would cause the speech synthesis module to announce a phrase such as "Hi, I am ready".

From the above, it is seen that in order to initiate a drying operation, the speech recognition module must recognize two distinct word groups within a fixed period of time, here two seconds. Continuation of the program will not proceed unless and until both words have been recognized in the proper order. Such recognition is confirmed by the control system by an audible announcement and by the mechanical operation of opening the dryer door.

Once the announcement has been made by control unit 120, control is passed to control unit 122 which continuously inquires whether the dryer door 20 has been closed. An appropriate signal on line 94 from the dryer to the microcomputer will provide the input for answering a question. The microswitch 46 which is associated with the door 20 will provide the appropriate signal.

Once the microcomputer 54 has sensed that the door has been closed, then control is passed to control unit 124 which causes the speech synthesis module to make the announcement "Please check the lint filter". Control is then passed to control unit 126 which inquires whether the lint filter has been checked. This inquiry is made by the microcomputer by sensing the signal provided on line 96 which is connected to a microswitch associated with the lint trap. The microcomputer 54 will wait for a signal indicating that the lint trap has been removed and replaced. Once such a signal has been received, control will be passed to control unit 128 which will cause the speech synthesis module to make the announcement "Please select fabric temperature cycle".

Upon making the announcement, control will be passed to control unit 130 which will turn on the speech recognition module by an appropriate signal on line 76. Control will then be passed to control unit 132 which will send a signal on line 78 to select vocabulary "0". Control will then be passed to control unit 134 which will pulse the dryer control relay by sending an appropriate signal on line 84. Control will then be passed to control unit 136 which will inquire whether the word "Regular" has been recognized. If that word has been recognized then control is passed to control unit 138 and a high temperature output is set by an appropriate signal from the microcomputer on line 74. If the word "Regular" has not been recognized, then control is passed to control unit 140 which inquires whether the word "Permanent press" has been recognized. If that word has been recognized, then control is passed to control unit 142 which sets a medium temperature output. If the word "Permanent press" has not been recognized, then control is passed to control unit 142 which inquires whether the word "Delicate" has been recognized. If that word has been recognized, then control is passed to control unit 144 which sets a low temperature output. If the word "Delicate" has not been recognized then control is passed to control unit 146 which inquires whether the word "air" has been recognized. If that word has been recognized, then control is passed to control unit 148 which sets an air only output. If the word "air" has not been recognized, then control is passed to control unit 150 which inquires whether a touch panel selection has been made. If such a selection has not been made, then control is returned to control unit 136 for repetition of the above steps. If any of the words have been recognized or if the touch panel selection has been made, then control is passed to control unit 152 which causes the speech recognition module to be turned off and then control is passed to control unit 154 which causes the speech synthesis module to announce "The control is ready".

After the announcement has been made, control is passed to control unit 156 which causes the speech recognition module to be turned on. Control is then passed to control unit 158 which causes an appropriate signal to be passed on line 78 to select vocabulary "1". Control is then passed to control unit 160 which inquires whether the word "OK" has been recognized. Once that word has been recognized, then control is passed to control unit 162 which causes the speech recognition module 50 to be turned off. Control is then passed to control unit 164 which sends an appropriate signal on line 80 to turn on a motor select output. Control is then passed to control unit 166 which sends an appropriate signal on line 82 to turn on a heat select output.

At this point, the dryer will proceed in a normal drying operation such as that disclosed in U.S. Pat. No. 4,385,452 identified above. However, during the normal drying operation, a user of the dryer may open the dryer door for various reasons, and therefore, after the heater select output has been turned on by control unit 166, control is passed to control unit 168 which inquires whether the dryer door 20 has been opened. If the door is opened during the operation of the dryer, then control is passed to control unit 170 which turns the heater select output off and then control is passed to control unit 172 which turns the motor select output off. Control is then passed to control unit 174 which inquires whether the door has been closed. Once the microcomputer 54 has sensed that the door has been closed, then control is passed to control unit 176 which inquires whether the dryer has been turned off. If the dryer has been turned off, then control is passed to control unit 178 which in turn passes control to control unit 100 to restart the entire program. If the dryer has not been turned off after the door is closed, then control passes to control unit 180 which in turn passes control back to control unit 128 for reselection of the fabric temperature cycle. The steps described above will then be repeated.

After each inquiry by control unit 168 of whether the door 20 is open, if a negative answer is sensed, then control is passed to control unit 182 which inquires whether the dryer has been turned off, which may occur automatically by means of an automatic drying control program. If the dryer has not yet been turned off, then control is returned to control unit 168 to proceed as described above. If the dryer has been turned off, then control is passed to control unit 184 which causes the heater select output to be turned off. Control is then passed to control unit 186 which causes the motor select output to be turned off. Control is then passed to control unit 188 which in turn passes control back to control unit 100 to restart the entire program.

Thus it is seen that a voice command appliance control system is provided in which a control program is initiated by speaker independent recognition of two separate word groups in close temporal proximity, and following such recognition various mechanical operations and audible inquiries are made. Further voice commands and responses are recognized to establish various parameters of operation of the device and upon recognition of a final spoken authorization in response to an audible inquiry, the device is operated in accordance with the selected parameters. Provision is also made for interruption of the device during the operation mode.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limited of the present invention, excepting as it is set forth and defined in the hereto appended claims.

The embodiments of the invention in which an exclusive property or privilege is claimed are defined as follows:

1. A method of preparing an appliance having an openable door for operation comprising the steps:
   (1) recognizing a first voice command,
   (2) counting pulses from a source of timing signals on a counter,
   (3) recognizing a second voice command within a predetermined time span of the recognition of said first voice command,
   (4) automatically opening a door of said appliance in response to the recognition of the voice commands,
   (5) emitting a first audible synthesized speech signal indicating that said door is open,
   (6) sensing the positional condition of said door,
   (7) emitting at least one additional audible synthesized speech signal requesting an input command after said door is sensed to be closed,
   (8) receiving the input command in response to said signal,
   (9) emitting an audible synthesized speech signal indicating that said appliance is in condition to begin operation after receiving said command,
   (10) recognizing a final voice command, and
   (11) initiating operation of said appliance upon recognition of said final voice command.

2. The method of claim 1, wherein said step of receiving input commands comprises recognizing voice commands.

3. The method of claim 1, wherein said step of receiving input commands comprises recognizing voice commands and receiving manually input commands.

4. A device for preparing an appliance having an openable door for operation comprising:
   means for recognizing a first voice command,
   means for establishing a first time interval upon recognition of said first voice command,
   means for recognizing a second voice command within said time interval,
   means for automatically opening a door of said appliance in response to the recognition of the second voice command,
   means for emitting a first audible synthesized speech signal indicating that said door is open,
   means for sensing the positional condition of said door,
   means for emitting a second audible synthesized speech signal requesting manual action, after said door is sensed to be closed,
   means for sensing when said manual action has occurred,
   means for emitting a third audible synthesized speech signal requesting either verbal or manual action,
   means for sensing whether said verbal or manual action has occurred,
   means for establishing a second time interval,
   means for repeating said third speech signal if said action has not occurred within said second time interval,
   means for emitting an audible synthesized speech signal indicating that said appliance is in condition to begin operation after sensing that said action has occurred,
   means for recognizing a final voice command, and
   means for initiating operation of said appliance upon recognition of said final voice command.

5. The device of claim 4 wherein said means for recognizing voice commands includes a means for selecting a vocabulary of acceptable commands to be recognized.

6. The device of claim 4 including a controller means for the functions of each of the means described.

7. A method of preparing an appliance having an openable door for operation comprising the steps:
   (1) recognizing a first voice command,
   (2) counting pulses from a source of timing signals on a counter,
   (3) recognizing a second voice command within a predetermined time span of the recognition of said first voice command, (4) automatically opening a door of said appliance in response to the recognition of the voice commands,
(5) emitting a first audible synthesized speech signal indicating that said door is open,
(6) sensing the positional condition of said door,
(7) emitting a second audible synthesized speech signal requesting manual action, after said door is sensed to be closed,
(8) sensing when said manual action has occurred,
(9) emitting a third audible synthesized speech signal requesting either verbal or manual action,
(10) sensing whether said verbal or manual action has occurred,
(11) counting pulses from said source of timing signals on said counter,
(12) repeating said third speech signal is said action has not occurred within a predetermined time interval,
(13) emitting an audible synthesized speech signal indicating that said appliance is in condition to being operation after sensing that said action has occurred,
(14) recognizing a final voice command, and
(15) initiating operation of said appliance upon recognition of said final voice command.

8. A device for preparing an appliance having an openable door for operation comprising:
means for recognizing a first voice command,
means for establishing a time interval upon recognition of said first voice command,
means for recognizing a second voice command within said time interval,
means for automatically opening a door of said appliance in response to the recognition of said second voice command,
means for emitting a first audible synthesized speech signal indicating that said door is open,
means for sensing the positional condition of said door,
means for emitting at least one additional audible synthesized speech signal requesting an input command after said door is sensed to be closed,
means for receiving said input command in response to said signal,
means for emitting an audible synthesized speech signal indicating that said appliance is in condition to begin operation after receiving said command,
means for recognizing a final voice command, and
means for initiating operation upon recognition of said final voice command.

* * * * *